Patented Aug. 7, 1951

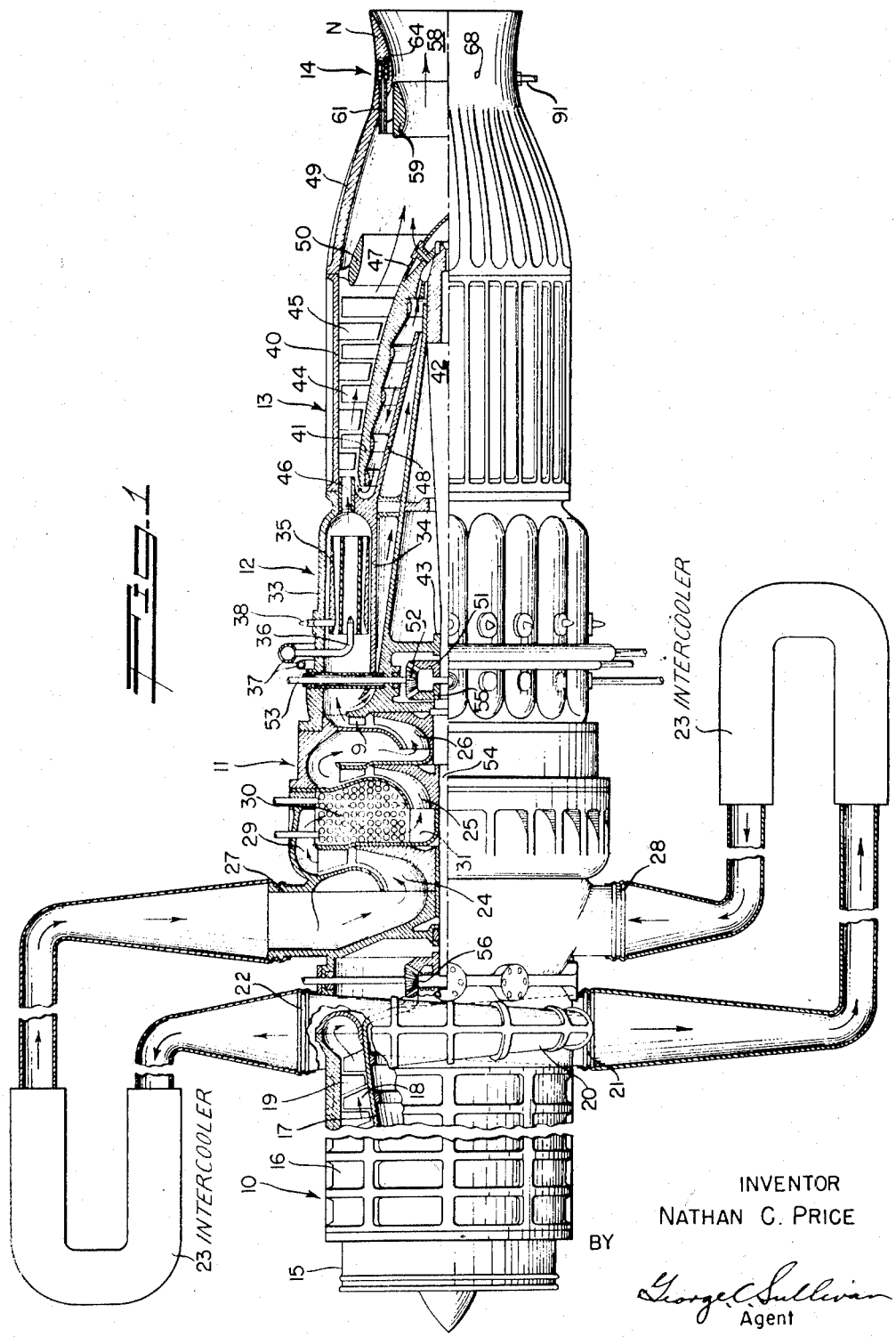

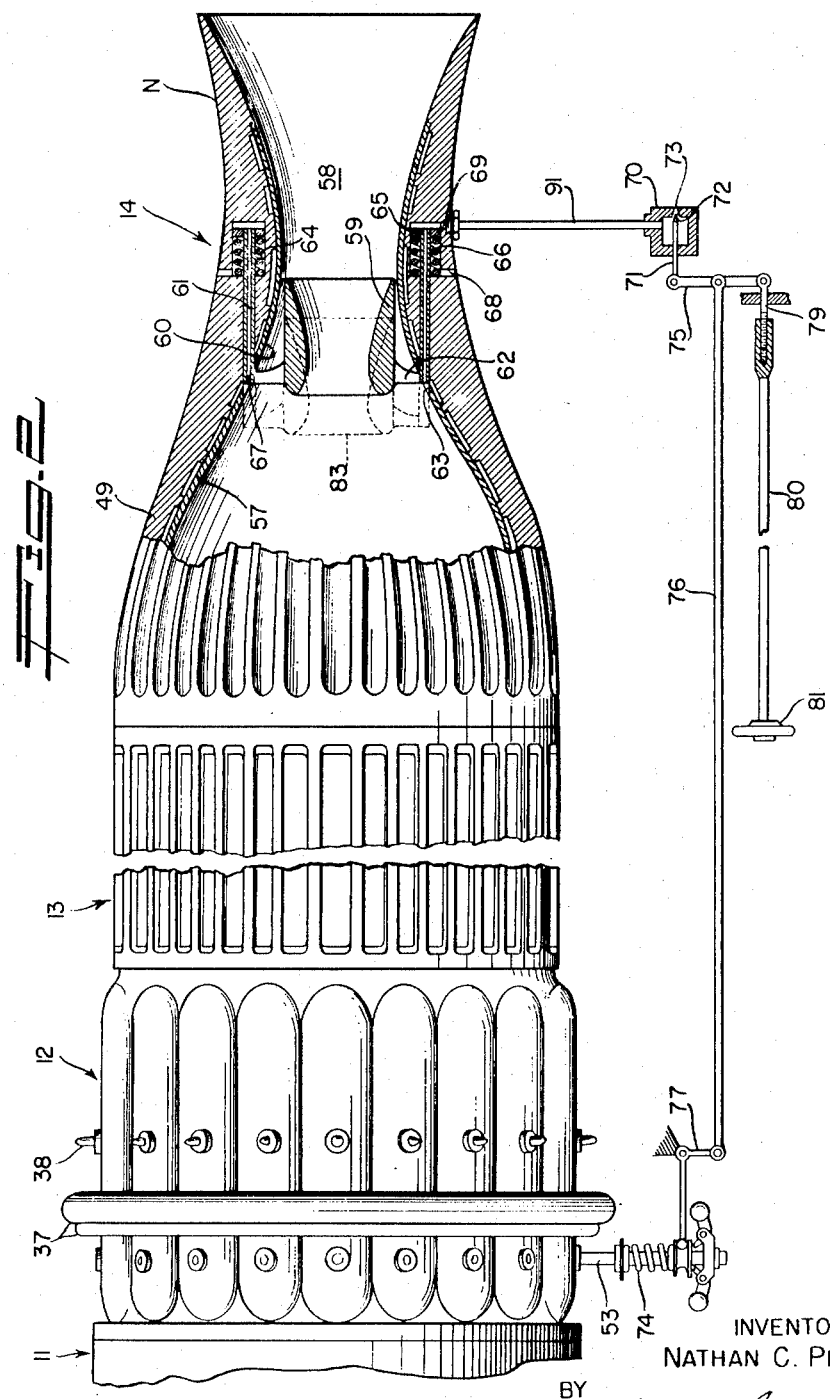

2,563,745

UNITED STATES PATENT OFFICE 2,563,745

VARIABLE AREA NOZZLE FOR POWER PLANTS

Nathan C. Price, Los Angeles, Calif., assignor to Lockheed Aircraft Corporation, Burbank, Calif.

Original application March 6, 1942, Serial No. 433,599, now Patent No. 2,540,991, dated February 6, 1951. Divided and this application March 14, 1947, Serial No. 734,649

19 Claims. (Cl. 60—35.6)

This invention relates to reactive propulsion powerplants and has more particular reference to nozzles for this type of powerplant. The present invention is primarily intended for embodiment in internal combustion reaction type powerplants for aircraft and other high speed vehicles where the propulsion is obtained in whole or in part by the reactive effect of a high velocity gas jet.

This application is a division of my co-pending application Serial No. 433,599, filed March 6, 1942, Patent Number 2,540,991, issued February 6, 1951.

In my co-pending application just referred to, I have disclosed a powerplant comprising multistage air compressors, a combustion chamber receiving the compressed air from the compressors, a gas turbine receiving the air and gases of combustion from the chamber, and serving to drive the compressors and a nozzle for discharging the turbine exhaust in the form of a reactive propulsive jet. The speed of operation of the turbine and, therefore, of the compressors, is dependent to a large degree upon the back pressure imposed on the turbine by the nozzle. Accordingly, variations in the effective area of the nozzle govern the speed of operation of the gas turbine and compressors. If provision is made for the injection of supplemental fuel into a supplemental combustion chamber, the temperature of the gases is increased and there is an increase in the volumetric flow through the nozzle which imposes a greater back pressure on the turbine. Variations in the pressure altitude and ambient air temperatures likewise tend to vary the nozzle pressures and temperatures and the back pressure on the turbine.

It is an object of this invention to provide a powerplant of the class referred to incorporating an efficient nozzle for discharging the combustion gases and compressed air in the form of a high velocity reactive propulsion jet and incorporating means for varying the effective cross-sectional area of the nozzle to govern the speed of operation of the gas turbine and therefore control or affect the operation of the powerplant as a whole. The nozzle mechanism of the invention serves to vary the effective area of the nozzle passage and thereby control the back pressure on the turbine to compensate for variations in altitude pressures, ambient air temperatures and nozzle temperatures.

It is another object of the invention to provide a nozzle mechanism for gas reaction powerplants embodying simple effective means for automatically varying the effective area of the nozzle passage. The invention provides a throat member movable axially toward and away from the partially restricted throat of the nozzle passage to alter the cross-sectional area of the nozzle while maintaining an efficient reactive jet effect.

A further object of the invention is to provide a nozzle means of the character referred to having a cylinder and piston device for moving the throat member in response to variations in the pressure in the supplemental combustion chamber and nozzle.

A still further object of the invention is to provide a nozzle construction of the class referred to wherein the cylinder and piston mechanism for moving the throat member is automatically controlled by a speed governor driven by the turbine and therefore reflecting turbine speed and compressor speed. Provision is made for manually setting or adjusting the speed governor so that the throat member may be made to assume any selected position for given powerplant operating conditions.

Other objects and features of the invention will become apparent from the following detailed description of a typical preferred form of the invention, throughout which reference will be made to the accompanying drawings, wherein:

Figure 1 is a side elevation of a powerplant embodying a nozzle means of the invention, with the upper portion of the powerplant appearing in longitudinal cross-section and with the nozzle control means removed; and Figure 2 is an enlarged side elevation of a portion of the powerplant with the nozzle means and adjacent parts appearing in longitudinal cross-section and illustrating the nozzle control means.

The regulable or adjustable area nozzle mechanism of the invention is suitable for application to or embodiment in reaction propulsion powerplants varying considerably in type, design and intended application and, of course, may be modified somewhat to adapt it for given installations. In the drawings, I have shown the nozzle mechanism associated with a gas turbine reactive propulsion powerplant of the class disclosed in my co-pending application referred to above. The general structure of the powerplant is disclosed herein because the nozzle mechanism is operatively related to its various components. However, the specific construction of the powerplant is omitted as not essential to an undertaking of the present invention.

Referring now to Figure 1, the powerplant comprises generally, first and second stage compressors 10 and 11, a combustion chamber 12, a gas turbine 13, and a nozzle means 14.

The powerplant is adapted for use in high speed, high altitude aircraft and is designed to handle a substantial volumetric air flow. The first stage compressor 10 is of the axial flow type and is provided at its forward end with a tubular spigot 15 for the reception of rammed air. The spigot 15 faces forwardly with relation to the direction of flight of the aircraft and is of substantially the same diameter as the housing 16 of the compressor. The compressor 10 includes a wheel or rotor 17 of forwardly diminishing diameter supported concentrically in the housing 16 for rotation therein. The rotor 17 carries axially spaced rows of circumferentially spaced blades 18 and the housing carries a plurality of rows of diffuser vanes 19 arranged to extend intermediate the rows of impeller blades 18. The rear or exhaust end of the compressor terminates in a double scroll outlet housing 20 having a pair of outlet spigots 21 and 22 which communicate with intercoolers 23.

The second stage compressor 11 shown in Figure 1 is of the multi-stage radial flow type and comprises three stages 24, 25 and 26 of centrifugal compression arranged in tandem relation. The first stage centrifugal compressor 24 is at the rear of the scroll 20 and has two spigots 27 and 28 receiving the first stage compressed air from the intercoolers 23. An annular exhaust duct 29 of the compressor 24 directs the compressed air through a liquid fed intercooler 30 which in turn directs the air to the inlet 31 of the second stage centrifugal compressor 25. The second and third stage centrifugal compressors are directly connected in tandem and the air from the final stage compressor passes through diffuser vanes 9 to the combustion chamber 12.

The combustion chamber 12 comprises a housing 33 and an annular shroud 34 which together define an annular space leading from the exhaust of the final stage compressor 26 to the nozzle ring 46 of the turbine. The housing and shroud are shaped to have an annular series of interconnected parallel pockets which carry burner tubes 35. Fuel spray nozzles 36 extend into the tubes 35 and are supplied with compressed air and fuel by annular supply manifolds 37. Electrical resistance glow plugs 38 serve to ignite the fuel-air mixture formed in and flowing through the combustion chamber.

The gas turbine 13 includes a cylindrical housing 40 and a tapered rotor 41 coaxially positioned in the housing. The rotor 41 is fixed to a shaft 42 rotatably supported by one or more bearings 43. Impeller blades 44 on the rotor 41 operate between rows of stator blades 45 on the housing 40. The above mentioned nozzle ring 46 discharges the gases of combustion and excess air from the combustion chamber 12 into the expansion zone of the turbine.

Provision is made for the injection of supplemental fuel from the apex of the turbine 41. A cap at the apex of the rotor has divergent orifices 47 supplied with fuel by the hollow turbine shaft 42. Supplemental fuel injected at the orifices 47 greatly increases the thrust of the powerplant, the supplemental fuel burning in the excess air leaving the turbine and entering the propulsive nozzle.

Cooling air from the exhaust passage of the final stage compressor 26 flows through the interior of the turbine rotor 41 to adjacent its apex and then flows back or forwardly around a baffle 48 as indicated by the arrows in Figure 1 to discharge into the expansion zone of the turbine at the forward end of its rotor. This free or unconsumed air is continuously circulated through the rotor 41 to cool the same and is mixed with the gases of combustion and unconsumed air leaving the combustion chamber 12. A secondary combustion chamber 49 extends rearwardly from the turbine housing. The chamber 49 is rearwardly convergent and carries an internal annular baffle 50. The baffle 50 is arranged in the entrance of the secondary combustion chamber to surround or oppose the supplemental fuel orifices 47.

Power is transmitted from the turbine 13 to the compressors 10 and 11 by gear transmissions. A beveled gear 51 is fixed on the forward end of the rotor shaft 42 and meshes with beveled pinions 52, each splined to a radial auxiliary shaft 53. The radial flow compressor 11 has a shaft 54 and a gear 55 is fixed on the shaft to mesh with the pinions 52. Thus the compressor shaft 54 is driven by the turbine 13 in a counter-rotation direction. A somewhat similar gear transmission 56 is provided between the shaft 54 of the second stage compressor 11 and the rotor of the first stage compressor 10 to drive the latter at the selected speed in relation to the second stage compressor. The details of this gear mechanism are omitted as not essential to an understanding of the present invention.

The nozzle means 14 of the invention includes a nozzle N continuing rearwardly from the secondary combustion chamber 49 and designed to produce an effective reactive propulsive jet of the combustion gases and air exhausting from the turbine 13 and secondary combustion chamber. The nozzle N may be a continuous tubular extension of the chamber 49 and is preferably lined with a refractory lining 57 of carborundum or the like. This lining 57 continues forwardly to cover the inner wall of the chamber 49. In the construction illustrated the nozzle N has a Venturi shaped passage 58 clearly illustrated in Figures 1 and 2.

The nozzle means further includes an inner longitudinally movable annular throat member 59 arranged at the upstream side of the throat restriction of the nozzle passage 58. The member 59 has a cylindrically curved external surface and an airfoil shaped internal surface defining a Venturi-like passage. As illustrated in the drawings, the throat member 59 is proportioned so as to be spaced from the internal wall of the nozzle N leaving an annular passage 60. The throat member 59 is supported by a plurality of parallel axially extending rods 61. Generally radial arms 62 extend between and connect the rods 61 and the forward end portion of the throat member 59. The rods 61 extend rearwardly to slidably pass through openings 63 in the lining 57 and enter an annular servo cylinder 64 in the wall of the nozzle N. The rear ends of the rods 61 are fixed to an annular piston 65 operating in the cylinder. A number of coil springs 66 is arranged under compression between the piston 65 and the forward wall of the cylinder 64 to urge the rods 61 and throat member 59 rearwardly.

The rods 61 just described have axial bores 67 which extend rearwardly through the piston 65. The forward ends of the openings or bores 67 communicate with the interior of the nozzle N and secondary combustion chamber 49 and the rear ends of the bores communicate with the working end of the cylinder 64. Thus the bores 67 serve to conduct the gases under pressure from the chamber 49 and nozzle N to the cylinder to act forwardly against the piston 65. The forward end of the cylinder 64 has a plurality of vent ducts 68 leading through the wall of the nozzle N to the atmosphere.

A control system is provided for determining or governing the position of the throat member 59 and thus determining the effective cross-sectional area of the nozzle N. This system includes a bleed duct 69 communicating with the forward or active end of the cylinder 64 and connected with the body of a bleed control valve 70 by a tube 91. The control valve 70 may be located at any convenient place in the aircraft. The valve 70 includes a stem 71 adapted to cooperate with a beveled valve seat 72 which surrounds an atmospheric vent 73. In accordance with the invention the valve is sensitive to powerplant speed, that is to variations in the speed of the turbine 13 and compressors 10 and 11. The valve stem 71 is operatively connected through suitable linkage with a speed governor 74. The linkage may comprise a lever 75 connected with the valve stem 71, a rod 76 pivotally connected with the lever and a bell crank 77 connected with the rod 76 and operatively associated with the governor 74. The governor 74 is driven by one of the above described auxiliary shafts 53 to operate in response to the speed of the turbine 13. The linkage just described is such that upon an increase in speed of the turbine 13 the governor 74 acts to increase the effective area of the bleed valve vent opening 73 and upon a decrease in turbine speed acts to reduce the effective area of the needle valve vent.

Manually operable means is provided to regulate or adjust the speed setting of the governor 74 with respect to the needle valve action. The lever 75 is pivotally supported on a threaded shaft 79 which can be manually adjusted by a shaft extension 80 provided with a hand wheel 81. The movable annular throat member 59 is shaped so that its axial displacement resulting from pressure variations in the cylinder 64 changes the effective area of the nozzle passage while maintaining a high nozzle efficiency. The pressure in the cylinder 64 is varied or influenced by pressure and temperature conditions in the powerplant and is modified by the governor controlled needle valve 70.

During operation of the powerplant the pressure in the secondary combustion chamber 49 is transmitted through the ducts 67 of the rods 61 to the cylinder 64 and acts on the piston 65 to urge the throat member 59 forwardly. This gas pressure compresses the springs 66 and urges the member 59 toward its forward position indicated by the broken line 83 where the nozzle N has a maximum effective cross-sectional area. The initial setting or adjustment of the speed governor 74 is obtained by the screw 79 remotely controlled by the shaft 80 and wheel 81 which may be located in the flight compartment for convenience of operation.

If the pressure in the secondary combustion chamber 49 increases above a correct value due to the introduction of supplemental fuel, for example, the turbine speed will tend to decrease due to the attendant back pressure and the resultant corresponding increase in pressure in the cylinder 64 then tends to move the annular throat member forwardly in the nozzle N to increase the effective area of the nozzle throat with an accompanying reduction of back pressure on the turbine, tending to correct the condition. If the pressure altitude of the aircraft varies the corresponding tendency upon the gas turbine speed by altered compressor load also reacts on the governor 74 and the accompanying actuation of the needle valve stem 71 is such as to correspondingly open or close the effective area of the nozzle throat. Accordingly, a substantially constant turbine speed is maintained when the pressure altitude is increased or decreased. The gas turbine carries whatever load is imposed on it by the compressor system and the airplane auxiliaries. If the turbine produces a power excess the speed governor 74 acting through the above described nozzle mechanism will increase the back pressure on the turbine. If there is a reduction in turbine power the speed governor decreases the back pressure on the turbine by changing the position of the nozzle throat member 59. Accordingly the gas turbine and the directly connected compressor means are operated as constant speed devices. Consequently the efficiency of these units is particularly high under all operating conditions and at all altitudes and the powerplant is stable under conditions of rapid change of load.

Having described only a typical form of the invention, I do not wish to be limited to the specific details herein set forth, but wish to reserve to myself any variations or modifications that may appear to those skilled in the art and/or fall within the scope of the following claims.

I claim:

1. In a gas reaction propulsive unit, apparatus comprising in combination, a gas turbine, a nozzle communicating with the exhaust of said turbine and adapted to produce a propulsive jet of combustion gases, means responsive to the combined effect of the discharge pressure and the speed of said gas turbine to vary the effective cross-sectional area of the throat of said nozzle to regulate the back pressure on said turbine in such manner as to tend to maintain said gas turbine at a constant speed.

2. In a gas reaction propulsive unit, apparatus comprising in combination, a gas turbine, a nozzle communicating with the exhaust of said turbine and adapted to produce a propulsive jet of combustion gases, means responsive to the speed of said gas turbine to vary the effective cross-sectional area of the throat of said nozzle to regulate the back pressure on said turbine in such manner as to tend to maintain said gas turbine at a constant speed.

3. In a gas reaction propulsive unit, apparatus comprising in combination, a gas turbine, a nozzle having a convergent-divergent passage communicating with the exhaust of said turbine adapted to produce a propulsive jet of combustion gases, an annular shaped airfoil sectioned throat member in said passage, said member being spaced from the wall of the passage to leave a flow path therebetween and being longitudinally movable to vary the effective cross-sectional area of the throat of said nozzle to regulate the back pressure on said turbine, means operable to move said throat member, and governor means responsive to the rotative speed of the turbine for modifying the operation of said means for moving the throat member.

4. In a gas reaction propulsive unit, apparatus comprising in combination, a gas turbine, a nozzle communicating with the exhaust of said turbine and adapted to produce a propulsive jet of combustion gases, the nozzle having a throat restriction spaced between its ends, an annular shaped airfoil sectioned throat member coaxially positioned with respect to the nozzle opening at the upstream side of said restriction and adapted to be moved longitudinally along the nozzle axis toward and away from said restriction of said nozzle in a manner adapted to vary the effective cross-sectional area of the throat of said nozzle to regulate the back pressure on said turbine, said member being spaced from the inner wall of the nozzle to leave a flow path, means operable to move the throat member, and a governor driven by the turbine and operable to modify the operation of the first named means in accordance with the rotative speed of the turbine.

5. In a gas reaction propulsive unit, apparatus comprising in combination, a gas turbine, a nozzle communicating with the exhaust of said turbine and adapted to produce a propulsive jet of combustion gases, an annular shaped throat member coaxially positioned with respect to the nozzle opening and adapted to be moved longitudinally along the nozzle axis with respect to the section of maximum contraction of said nozzle in a manner adapted to vary the effective cross-sectional area of the throat of said nozzle, and means responsive to the combined effect of the discharge pressure and the speed of said gas turbine to move the said throat member in such manner as to tend to maintain said gas turbine at a constant speed.

6. Apparatus according to claim 5 in which the means to move the auxiliary throat member comprises a servo-cylinder, a piston in said cylinder adapted to take a position in said cylinder proportional to fluid pressure therein, means to transmit fluid pressure to said cylinder in proportion to the discharge pressure of said gas turbine, means to modify said fluid pressure on said piston in accordance with a function of the rotative speed of said turbine and a mechanical linkage movably coupling said piston and said annular throat member.

7. In a gas reaction propulsive unit, apparatus comprising in combination, a gas turbine, a secondary combustion chamber in down stream relation to the turbine, means for introducing fuel into said chamber, a nozzle communicating with down stream side of said chamber and adapted to produce a propulsive jet of combustion gases, fluid pressure actuated means responsive to the discharge pressure of said turbine to vary the effective cross-sectional area of the throat of said nozzle to regulate the back pressure of said turbine in such a manner as to tend to maintain said gas turbine at a constant speed, and governor means responsive to the rotative speed of the turbine for modifying the action of said fluid pressure actuated means.

8. In a gas reaction propulsive unit, apparatus according to claim 1 in which the means to vary the effective cross-sectional area of the throat of the nozzle comprises, an annular shaped airfoil sectioned longitudinally movable throat member adapted to be moved along the nozzle axis with respect to the section of maximum contraction of said nozzle.

9. In a gas reaction propulsive unit, apparatus in accordance with claim 2 in which the means to vary the effective cross-sectional area of the throat of said nozzle comprises, an annular shaped airfoil sectioned longitudinally movable throat member adapted to be moved along the nozzle axis with respect to the section of maximum contraction of said nozzle.

10. In a gas reaction propulsive unit, apparatus comprising in combination, a gas turbine, a nozzle communicating with the the exhaust of said turbine and adapted to produce a propulsive jet of combustion gases, an annular shaped throat member coaxially positioned with respect to the nozzle opening and adapted to be moved longitudinally along the nozzle axis with respect to the section of maximum contraction of said nozzle in a manner adapted to vary the effective cross-sectional area of the throat of said nozzle, and means responsive to the speed of said gas turbine to move said throat member in such manner as to tend to maintain the gas turbine at a constant speed.

11. In a gas reaction propulsive unit, the combination of a gas turbine, a nozzle communicating with the exhaust of said turbine and adapted to produce a propulsive jet of combustion gases, and means responsive to the speed of said turbine to vary the effective cross-sectional area of the throat of said nozzle.

12. Nozzle means for a reactive propulsion power plant having a gas turbine and a turbine exhaust passage, the nozzle means comprising a nozzle communicating with said passage, a throat member movable in the nozzle to vary the effective area of the nozzle, fluid pressure actuated means for moving the throat member, and means responsive to the speed of said turbine for modifying the action of said fluid pressure actuated means.

13. Nozzle means for a reactive propulsion power plant having a gas turbine and a turbine exhaust passage, the nozzle means comprising a nozzle communicating with said passage, a throat member movable in the nozzle to vary the effective area of the nozzle, fluid pressure actuated means for moving the throat member, means responsive to the speed of said turbine for modifying the action of said fluid pressure actuated means, and manually operable means for regulating the last named means.

14. Nozzle means for a reactive propulsion power plant having a gas turbine and a turbine exhaust passage, the nozzle means comprising a nozzle communicating with said passage, a throat member movable in the nozzle to vary the effective area of the nozzle, means for moving the throat member, and means responsive to the speed of said turbine for modifying the action of the means for moving the throat member.

15. In a reactive propulsion powerplant having a gas turbine and a turbine exhaust passage, the combination of a nozzle casing communicating with said exhaust and adapted to discharge the turbine exhaust gases in the form of a reactive jet, a throat member movable in the nozzle casing to vary the back pressure imposed by the nozzle, fluid pressure actuated means for moving the throat member comprising a cylinder and a piston, a conduit for conducting actuating fluid pressure to the cylinder of said means, a second conduit for conducting fluid pressure from said cylinder, valve means for one of said conduits operable to control the operation of said means, governor means responsive to the rotative speed of the turbine for operating said valve, and manually operable means for regulating the speed setting of the governor means with respect to said valve.

16. In combination with a reactive propulsion powerplant having a gas turbine and a turbine exhaust passage, nozzle means for utilizing the turbine exhaust gases to secure a propulsive effect, said means comprising a tubular nozzle casing communicating with said passage, a throat member supported for axial movement in the nozzle casing to vary the back pressure imposed by the nozzle means, fluid pressure actuated means for moving the throat member including a cylinder and piston, means for supplying actuating fluid pressure to the cylinder of said means, and means responsive to the speed of the turbine for modifying the action of the fluid pressure actuated means.

17. Nozzle means for the exhaust passage of a reactive propulsion unit comprising a tubular nozzle communicating with said exhaust passage and having a throat restriction, a tubular throat member movable axially with respect to said restriction to vary the effective cross-sectional area of the nozzle, and means for moving the throat member including an annular cylinder in the wall of the nozzle, a piston operable in the cylinder and connected with the throat member, a conduit for supplying actuating fluid pressure to the cylinder, a second conduit for conducting fluid pressure from the cylinder, and means for controlling one of said conduits.

18. Nozzle structure for the exhaust of a reactive gas propulsion unit comprising a tubular nozzle for communicating with the exhaust, a throat restriction in the nozzle adjacent the discharge end of the same, there being axial openings passing through the wall of the restriction and having their forward ends open to the interior of the nozzle, a tubular throat member, through which the gases pass, and means for supporting the member for axial movement relative to the restriction including movable support rods spaced radially from the member and slidably supported in said openings to extend into the interior of the nozzle, and arms extending radially from the member to the rods to connect the same and spaced upstream from the restriction and from the downstream end of said member.

19. Nozzle means for a reactive propulsion unit having an exhaust comprising a nozzle communicating with exhaust of the unit, the nozzle including a nozzle wall, an axially movable throat member for varying the effective area of the nozzle, a cylinder and piston mechanism for moving the throat member including rods extending axially in said nozzle wall and projecting into the interior of the nozzle to support and move the throat member, said rods constituting the sole supports for the throat member, and means for conveying fluid pressure to the cylinder and piston mechanism to actuate the same.

NATHAN C. PRICE.

REFERENCES CITED

The following references are of record in the file of this patent:

UNITED STATES PATENTS

| Number | Name | Date |
|---|---|---|
| 607,548 | Pinkert | July 19, 1898 |
| 658,586 | Reiling | Sept. 25, 1900 |
| 941,426 | Loudon | Nov. 30, 1909 |
| 1,493,157 | Mélot | May 6, 1924 |
| 1,750,417 | McClellan et al. | Mar. 11, 1930 |
| 1,779,009 | Negro | Oct. 21, 1930 |
| 2,280,835 | Lysholm | Apr. 28, 1942 |
| 2,390,161 | Mercier | Dec. 4, 1945 |
| 2,402,363 | Bradbury | June 18, 1946 |

FOREIGN PATENTS

| Number | Country | Date |
|---|---|---|
| 848,225 | France | July 17, 1939 |
| 295,515 | Germany | July 30, 1917 |
| 310,926 | Germany | Feb. 8, 1919 |
| 483,888 | Germany | Oct. 7, 1929 |